United States Patent [19]

Babel

[11] Patent Number: 4,677,718
[45] Date of Patent: Jul. 7, 1987

[54] SAFETY HOOD FOR PALETTE CHANGE-OVER DEVICES OF MACHINE TOOLS

[75] Inventor: Werner Babel, Pfronten-Meilingen, Fed. Rep. of Germany

[73] Assignee: MAHO Werkzeugmaschinenbau Babel & Co., Fed. Rep. of Germany

[21] Appl. No.: 810,430

[22] Filed: Dec. 18, 1985

[30] Foreign Application Priority Data

Dec. 18, 1984 [DE] Fed. Rep. of Germany ....... 8437044

[51] Int. Cl.⁴ .............................................. F16P 3/04
[52] U.S. Cl. ..................................... 29/33 P; 29/563; 29/DIG. 60; 51/274; 74/613; 408/241 G; 409/134
[58] Field of Search ......... 29/33 P, 563, 57, DIG. 56, 29/DIG. 59, DIG. 60; 409/134; 51/274; 408/241 G, 710; 144/251 A; 74/608, 612, 613, 614, 616

[56] References Cited

U.S. PATENT DOCUMENTS

| | | | |
|---|---|---|---|
| 1,060,608 | 5/1913 | Knapp | 74/616 |
| 2,443,734 | 6/1948 | Kearney et al. | 74/612 X |
| 4,078,451 | 3/1978 | Norton et al. | 74/613 |
| 4,307,798 | 12/1981 | Watanabe | 74/613 X |
| 4,373,406 | 2/1983 | Piotrowski | 409/134 X |

Primary Examiner—Z. R. Bilinsky
Attorney, Agent, or Firm—Lahive & Cockfield

[57] ABSTRACT

In a machine tool having a palette change-over device protected by a movable U-shaped hood, to prevent injury to the operator or accidental damage during movement of the hood the hood is provided with a probe and an automatic circuit breaker arranged to shut down at least the driving mechanism of the hood on contact with the operator or another foreign body in the path of movement of the hood.

2 Claims, 2 Drawing Figures

SAFETY HOOD FOR PALETTE CHANGE-OVER DEVICES OF MACHINE TOOLS

TECHNICAL FIELD OF THE INVENTION

The invention relates to a safety hood for palette change-over devices of numerically controlled machine tools, consisting of a U-shaped hood, which in its operating position surrounds the palette change-over device, a driving mechanism for moving the hood, and guides for the hood, which are mounted on a fixed part of the machine.

With modern numerically controlled machine tools, especially with universal milling machines, not only the various machining processes performed on the work-pieces, but also other processes such as, for example, tool-changing and exchanging work-pieces mounted on palettes, take place automatically according to the relevant control program. Because of the position of the tool changer and the tool magazine, tool changing takes place, as a rule, outside the normal working area of the operator, so that special safety measures for these processes are not necessary.

This, however, is often not the case when the work-pieces are changed or exchanged with the use of a palette change-over device. This change-over device, made up of at least two moveable palette holders, is, as a rule, situated in front of the tool table, so that the individual palettes with the machined or the new work-piece can be automatically brought into the operating position on the work-piece table by means of suitable delivery means. During machining of one work-piece, the already machined work-piece is removed from the palette and the new work-piece is mounted. To this end it is necessary to move the palette change-over device into a position in which these tasks can be carried out comfortably by the operator. As soon as these mounting procedures are completed a hand switch is operated which shifts the driving mechanism of the change-over device, via the control, into the standby state, so that at the end of the work-piece machining the palette change-over can take place automatically. In this change-over the safety hood first moves vertically into its operating position, in which it screens the total area of movement of the change-over device up to head height of the operator. Only when the safety hood is in its end position, and thereby prevents accidental catching of the operator or projection of objects into the area of movement of the change-over device, are the various change-over operations completed. Since this vertical movement of the safety hood takes place automatically, that is immediately the machining of the work-piece ends, the possibility exists that there may be parts of the operator's body, or other foreign bodies, in the field of movement of the safety hood, which can lead to injuries and/or to damage to the machine.

OBJECT OF THE INVENTION

It is the object of the invention to reliably avoid such injuries or damage caused by the movements of the safety hood.

SUMMARY OF THE INVENTION

This object is achieved according to the invention by providing the hood with a probe with an emergency circuit breaker which shuts down the machine tool as soon as a foreign body comes into the path of movement of the hood.

Conveniently this probe is a mechanical feeler on the upper edge of the vertically moveable hood in the form of a slightly protruding pivoting stirrup which, on contact with the foreign body, pivots against spring resistance and thereby operates the emergency circuit breaker.

BRIEF DESCRIPTION OF THE DRAWINGS

An embodiment of the invention is now described in detail by way of example with reference to the drawing, in which.

DETAILED DESCRIPTION OF AN EMBODIMENT OF THE INVENTION

On the front of the cabin 1 of the machining centre shown there is a palette change-over device 2. This palette change-over device 2 is horizontally moveable relative to the work-piece table located within the cabin 1 and contains delivery devices (not shown) by which the palette carrying a tool can be pulled out of the operating position from the work-piece table and replaced by another palette with the new, unmachined work-piece.

Figure 1:
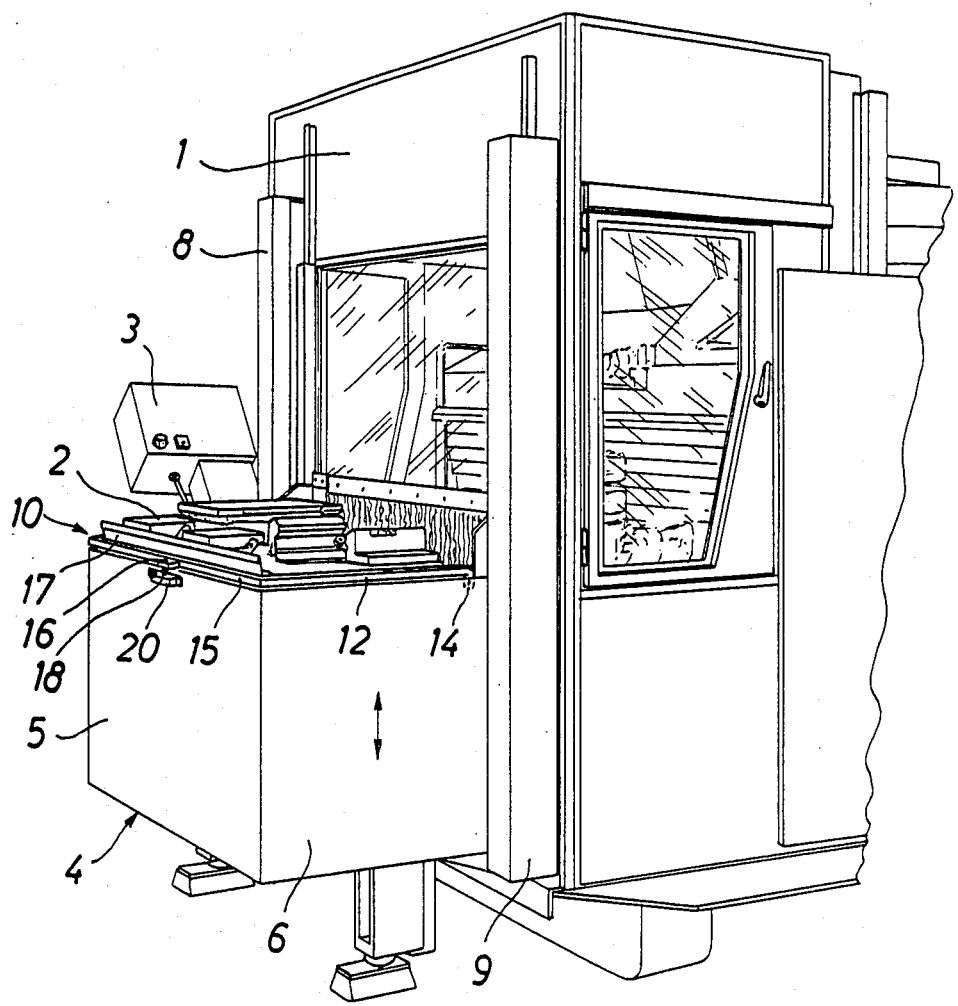
FIG. 1 shows a machining centre with a cabin on the front of which is a vertically moveable safety hood.
Figure 2:
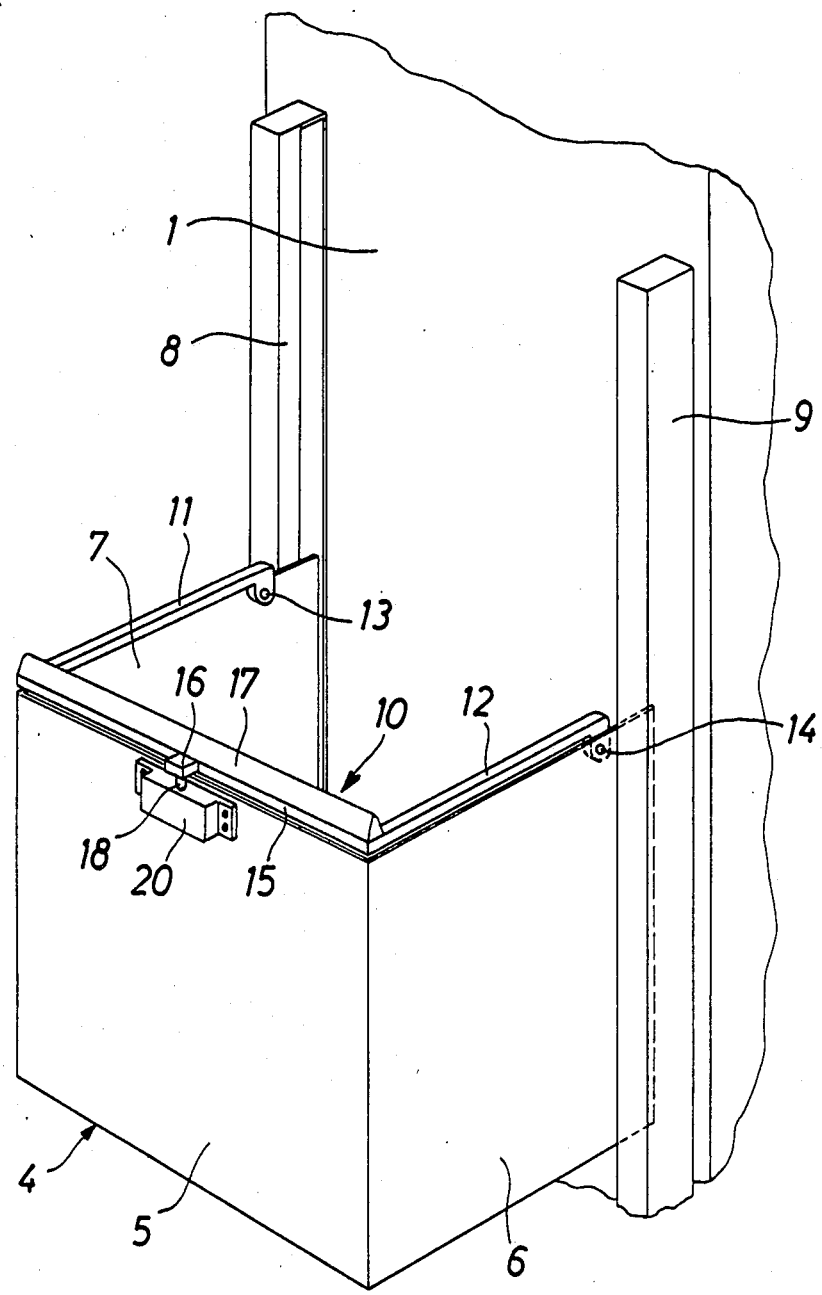
FIG. 2 shows the safety hood according to FIG. 1 in an enlarged perspective view.

This change-over device is surrounded by a U-shaped hood 4, which consists of a fore-part 5 and two side walls 6, 7, parallel to one another. Through a separate driving mechanism (not shown) this hood 4 moves independently of the change-over device 2 in vertical guides 8, 9, which are mounted on either side next to the access opening on the front 1 of the cabin. The side walls of the hood conveniently consist of light perforated plates or of translucent synthetic material, so that the automatic change-over processes can be observed through the hood. This safety hood 4 moves vertically upwards, in front of every palette change-over arrangement, from the position shown in FIG. 1, into its operational position, in which not just the change-over device but also the work-pieces mounted on the palettes are completely covered.

To avoid collisions in the course of this upward movement with foreign bodies unintentionally located in the area of movement of the safety hood, e.g. a part of the body of the operator, a U-shaped stirrup 10 is provided on the upper edge of the hood which is pivotably linked, in bearings 13, 14, to the two side walls 6, 7 of the hood by the ends of its two legs 11, 12 which are parallel to the side walls. On the bar 15 of the stirrup 4 are fastened a pressure contact 16 and a flexible rubber strip 17 serving as padding. The contact 16 cooperates with a spring-loaded actuating pin 18 which projects from the top of an emergency circuit breaker 20. This emergency circuit breaker is fixed to the upper end of the fore-part 5 and connected via electric lines (not shown) to the central control of the machine tool.

As soon as a foreign body is encountered in the area of movement during an upward movement of the safety hood 4, the stirrup 10 makes a pivoting movement downwards about its bearings 13, 14 and thereby operates the emergency circuit breaker 20 via the actuating pin 18, so as to shut down the palette change-over device 2 and the safety hood 4, or even the whole machine tool.

The invention is not limited to the embodiment shown. Thus for example one can use, instead of the mechanical feeler probe, electro-optical sensors or other proximity switches which produce a cut-out signal for the control as soon as there are foreign bodies in the area of movement of the hood.

What is claimed is:

1. A safety hood for palette change-over devices of numerically controlled machine tools, comprising
   A. a U-shaped hood which, in its operating position, surrounds the palette change-over device,
   B. a driving mechanism for moving the hood,
   C. guides for the hood, which guides are mounted on a fixed part of the machine, and
   D. a probe, disposed in association with the hood, with an emergency circuit breaker which shuts down at least the driving mechanism of the safey hood as soon as the hood encounters a foreign body, said probe including a slightly protruding stirrup pivotably linked to the upper edge of the vertically moveable hood, which stirrup, on contact with the foreign body, pivots vertically against spring resistance and operates the emergency circuit breaker.

2. A safety hood according to claim 1 wherein the U-shaped stirrup includes flexible padding at least on a cross-bar thereof, and wherein the U-shaped stirrup further includes legs having ends linked to side walls of the hood.

* * * * *